US008996417B1

(12) United States Patent
Channakeshava

(10) Patent No.: US 8,996,417 B1
(45) Date of Patent: Mar. 31, 2015

(54) METHOD AND SYSTEM FOR AUTOMATICALLY OBTAINING AND CATEGORIZING CASH TRANSACTION DATA USING A MOBILE COMPUTING SYSTEM

(75) Inventor: Girish Mallenahally Channakeshava, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/272,946

(22) Filed: Oct. 13, 2011

(51) Int. Cl.
*G07B 17/00* (2006.01)
*G06Q 20/16* (2012.01)

(52) U.S. Cl.
CPC ..................... *G06Q 20/16* (2013.01)
USPC ............................................ 705/30; 705/26.9

(58) Field of Classification Search
CPC ... G06F 3/04845; G06F 3/0484; G06F 3/048; G06Q 40/10; G06Q 40/02; G06Q 40/00; G06Q 40/12; G06Q 10/10
USPC ............................................................ 705/30
See application file for complete search history.

(56) References Cited

U.S. PATENT DOCUMENTS

| | | | |
|---|---|---|---|
| 5,530,438 A | 6/1996 | Bickham et al. | |
| 5,559,313 A | 9/1996 | Claus et al. | |
| 5,737,440 A | 4/1998 | Kunkler | |
| 5,796,868 A | 8/1998 | Dutta-Choudhury | |
| 5,878,337 A | 3/1999 | Joao et al. | |
| 6,167,378 A * | 12/2000 | Webber, Jr. ................ | 705/7.25 |
| 6,574,600 B1 | 6/2003 | Fishman et al. | |
| 6,908,031 B2 | 6/2005 | Seifert et al. | |
| 7,376,618 B1 | 5/2008 | Anderson et al. | |
| 7,970,701 B2 | 6/2011 | Lewis et al. | |
| 8,073,759 B1 | 12/2011 | Del Favero et al. | |
| 8,121,950 B2 | 2/2012 | Hassanein et al. | |
| 8,170,932 B1 | 5/2012 | Krakowiecki et al. | |
| 8,175,897 B2 | 5/2012 | Lee et al. | |
| 8,204,809 B1 | 6/2012 | Wise | |
| 8,234,195 B1 | 7/2012 | Berhanu et al. | |
| 8,244,629 B2 | 8/2012 | Lewis et al. | |
| 8,254,535 B1 | 8/2012 | Madhavapeddi | |
| 8,499,046 B2 | 7/2013 | Zheng | |

(Continued)

OTHER PUBLICATIONS

Kianieff, Muharem M. Consumer retail online electronic payments: Potential liberation technology or source of despair? York University (Canada), UMI Dissertations Publishing, 2008.*

(Continued)

*Primary Examiner* — Ryan Zeender
*Assistant Examiner* — Fawaad Haider
(74) *Attorney, Agent, or Firm* — Hawley Troxell Ennis & Hawley LLP; Philip McKay

(57) ABSTRACT

A financial management system and a user mobile computing system are provided and geo-location data indicating the position of the user mobile computing system is monitored. One or more cash transaction triggers are defined which are used to indicate that a possible cash transaction is taking place, or has taken place, involving the user. When a cash transaction trigger is detected, the geo-location of the user mobile computing system at the time of the cash transaction trigger detection is automatically recorded and used to identify/determine a business associated with, or closest to, the geo-location. A potential cash transaction entry is then automatically generated including description and/or categorization data for the potential cash transaction entry selected/determined based, at least in part, on the identified/determined business.

18 Claims, 3 Drawing Sheets

(56) References Cited

U.S. PATENT DOCUMENTS

| | | |
|---|---|---|
| 2002/0128917 A1 | 9/2002 | Grounds |
| 2003/0061132 A1 | 3/2003 | Yu et al. |
| 2003/0182218 A1 | 9/2003 | Blagg |
| 2004/0083134 A1 | 4/2004 | Spero et al. |
| 2004/0111371 A1 | 6/2004 | Friedman |
| 2005/0080649 A1 | 4/2005 | Alvarez et al. |
| 2005/0267840 A1 | 12/2005 | Holm-Blagg et al. |
| 2006/0031123 A1 | 2/2006 | Legget et al. |
| 2006/0036543 A1 | 2/2006 | Blagg et al. |
| 2006/0196930 A1 | 9/2006 | Hart et al. |
| 2008/0140505 A1 | 6/2008 | Romano et al. |
| 2008/0140576 A1 | 6/2008 | Lewis et al. |
| 2008/0208693 A1 | 8/2008 | Milstein et al. |
| 2008/0222037 A1 | 9/2008 | Foss et al. |
| 2008/0222054 A1 | 9/2008 | Blagg et al. |
| 2009/0030692 A1 | 1/2009 | Deligne et al. |
| 2009/0037461 A1 | 2/2009 | Rukonic et al. |
| 2009/0094182 A1* | 4/2009 | Najarian et al. ........... 706/46 |
| 2009/0222364 A1 | 9/2009 | McGlynn et al. |
| 2009/0300068 A1 | 12/2009 | Tang |
| 2009/0307136 A1 | 12/2009 | Hawkins |
| 2009/0321522 A1 | 12/2009 | Lohr et al. |
| 2009/0327134 A1* | 12/2009 | Carlson et al. ........... 705/44 |
| 2010/0138328 A1 | 6/2010 | Venturo et al. |
| 2010/0217691 A1 | 8/2010 | Gillin et al. |
| 2010/0287099 A1 | 11/2010 | Liu et al. |
| 2011/0029396 A1 | 2/2011 | Sobek |
| 2011/0093324 A1 | 4/2011 | Fordyce et al. |
| 2011/0112869 A1 | 5/2011 | Greak |
| 2011/0225637 A1 | 9/2011 | Counterman |
| 2011/0264543 A1* | 10/2011 | Taveau et al. ........... 705/23 |
| 2011/0282778 A1 | 11/2011 | Wright et al. |
| 2011/0302011 A1 | 12/2011 | Yoder et al. |
| 2012/0047052 A1 | 2/2012 | Patel |
| 2012/0130796 A1 | 5/2012 | Busch |
| 2012/0143772 A1 | 6/2012 | Abadir |
| 2012/0315881 A1 | 12/2012 | Woloshyn |
| 2013/0124263 A1 | 5/2013 | Amaro et al. |
| 2013/0318446 A1 | 11/2013 | Ghotgalkar et al. |

OTHER PUBLICATIONS

Whittam et al., "Method and System for Utilizing Location Data for Automatic Categorization of Financial Transactions," U.S. Appl. No. 13/149,776, filed May 31, 2011.

Bhattacharyya et al., "Method and System for Automatic Categorization of Check-Based Financial Transactions," U.S. Appl. No. 13/350,517, filed Jan. 13, 2012.

Channakeshava, "Method and System for Improving Automatic Categorization of Financial Transactions," U.S. Appl. No. 13/193,445, filed Jul. 28, 2011.

Madhani, "Method and System for Semi-Automated Setup of Accounts within a Data Management System," U.S. Appl. No. 13/416,966, filed Mar. 9, 2012.

Madhani, "Method and System for Automated Classification and Categorization of Hardcopy Financial Transaction Records," U.S. Appl. No. 13/456,383, filed Apr. 26, 2012.

Rukonic et al., "Method and System for Identifying a Merchant Payee Associated with a Cash Transaction," U.S. Appl. No. 13/653,083, filed Oct. 16, 2012.

Channakeshava, "Method and System for Automatic Classification of Check and Cash Transactions by a Financial Management System," U.S. Appl. No. 13/752,041, filed Jan. 28, 2013.

Channakeshava, "Method and System to Simplify the Financial Institution Discovery and Add Accounts Processes for Data Management Systems," U.S. Appl. No. 13/459,505, filed Apr. 30, 2012.

* cited by examiner

METHOD AND SYSTEM FOR AUTOMATICALLY OBTAINING AND CATEGORIZING CASH TRANSACTION DATA USING A MOBILE COMPUTING SYSTEM

BACKGROUND

Currently, several financial management systems are available to help an individual user, or an authorized party acting on behalf of an individual user, obtain a user's financial data, process/analyze the user's financial data, and generate various reports for the user.

Financial management systems typically help users manage their finances by providing a centralized interface with banks, credit card companies, and other various financial institutions, for electronically identifying and categorizing user financial transactions. Currently, financial management systems typically obtain electronic transaction based information, such as payee, payment amount, date, etc. via communication with banks, credit card providers, or other financial institutions, using electronic data transfer systems, or various other systems for transferring financial transaction data.

A financial management system's ability to identify and categorize specific financial transactions is what allows the financial management system to provide the features that are usually of most interest to the user. Typically, the ability to categorize specific financial transactions is, in turn, dependent on an ability of the financial management system to obtain, and properly analyze, the data necessary to identify and categorize specific financial transactions.

Using some currently available financial management systems, the electronic financial transaction data, such as payee, payment amount, date, etc. associated with a specific financial transaction is used by the financial management system to propose, and/or apply, a description to the specific financial transaction and/or a category to the specific financial transaction. As an example, if a given transaction that has a casino or hotel as the payee, the financial management system may apply a category of "entertainment" or "travel" for the financial transaction based solely on the payee being a location many people go to for entertainment, or when travelling.

While currently available financial management systems work quite effectively with credit card, ATM card, and various other types of financial transactions involving "plastic" or other electronic data-based systems, not all financial transactions involve card or other electronic data-based payment systems. For instance, any cash-based transaction, by definition, does not involve card or other electronic data-based payment systems.

Currently, some financial management systems provide the ability to more or less manually enter cash transactions/expenses into the financial management system, i.e., some financial management systems provide and "add a transaction" feature as a way to try and track cash transactions, and get a more complete picture of where the user's money is going. However, the capability to add cash transactions/expenses using a mobile application is currently largely unavailable, or overly burdensome to the user, due to several difficulties presented by mobile applications and mobile systems.

For instance, since entering cash transactions into a financial management system is currently a largely manual process, using mobile applications and mobile computing systems to enter a cash transaction into a financial management system is typically quite difficult. As a result, users often don't have time, or forget, to enter cash transaction data into a financial management system correctly when the transaction occurs. As a result, the user often waits, or tells themself they will wait, until a later time to attempt to manually enter the cash transaction data. However, at the later time, if it ever comes, the user often is not able to enter the cash transaction data into the financial management system because the user has forgotten the transaction details, and/or misplaced or lost the relevant receipts for the cash transaction.

In addition, even if the user does remember to enter a cash transaction into the financial management system, because the process is currently largely manual, it still takes significant time to record the cash transaction i.e. to fill out transaction details such as description, category, etc. Even when some automation is provided, such as a list, or pull down menu, showing transaction categories, the process is often still cumbersome and difficult using a mobile computing system. This is partly true because many financial management systems have hundreds of categories, including subcategories, and the user's own categories, and choosing one out of so many categories is often not a trivial task using a mobile computing system and mobile computing system display and interface. This situation is particularly problematic when the user has to enter several cash transactions and categorize them at one time.

In addition, typing and tagging on a mobile computing system, such as a smart-phone, is often difficult, tedious, and error-prone. This is largely because, while "qwerty" keyboards may be made to fit in a space less than 2" wide on a mobile computing system, this fact does not necessarily mean that the keyboard is easy and/or efficient to use, or even practical.

As a result of the situation described above, current financial management systems are severely limited in their ability to capture cash transaction data using a mobile application and mobile computing system. In a world that is rapidly moving to a mobile computing system model, where mobile computing systems, such smart phones, have become more affordable and capable, and users have come to rely, and to expect, more and more functionality from these devices, this is a significant limitation Clearly this situation is not ideal for either the users of the mobile computing systems and financial management systems or the providers of the mobile computing systems and financial management systems.

SUMMARY

In accordance with one embodiment, a system and method for automatically obtaining and categorizing cash transaction data using a mobile computing system includes a process for automatically obtaining and categorizing cash transaction data using a mobile computing system whereby one or more financial management systems are provided as well as a user mobile computing system. In one embodiment, one or more cash transaction triggers are defined which are used to indicate that a possible cash transaction is taking place, or has taken place, involving the user. In one embodiment, the geo-location of the user mobile computing system, and presumably the user, is monitored. In one embodiment, when at least one cash transaction trigger is detected, the geo-location of the user mobile computing system at the time of the cash transaction trigger detection is automatically recorded and used to identify/determine a business associated with, or closest to, the geo-location. In one embodiment, a potential cash transaction entry is then automatically generated including description and/or categorization data for the potential cash transaction entry selected/determined based, at least in part, on the identified/determined business. In one embodiment, data representing the potential cash transaction entry is then provided to the user as a reminder of the potential cash transaction and/or to obtain user approval of the potential cash transaction entry, including the automatically entered description and/or categorization data for the potential cash transaction entry. In one embodiment, if the potential cash transaction entry is approved, the user is also asked to provide data indicating the amount of the cash transaction. In one embodiment, upon user approval, the potential cash transaction entry data, including the automatically entered description and/or categorization data for the potential cash transaction entry, and the amount data, is transformed into validated cash transaction entry data and the validated cash transaction entry is provided to the one or more financial management systems for processing.

Using the system and method for automatically obtaining and categorizing cash transaction data using a mobile computing system, as discussed herein, potential cash transaction entry data, including description and/or categorization data, is generated automatically based on geo-location data associated with the user. Therefore, all a user needs to do is review the potential cash transaction entry, provide the transaction amount, and indicate approval of the cash transaction entry. The approved/validated cash transaction entry is then automatically provided to, and used by, the user's financial management system. Consequently, the system and method for automatically obtaining and categorizing cash transaction data using a mobile computing system, as discussed herein, provides the user a simple and efficient way to capture cash transaction data and integrate the cash transaction data into one or more financial management systems. Therefore, using the system and method for automatically obtaining and categorizing cash transaction data using a mobile computing system, financial management systems are easier to use and incorporate in a largely mobile computing system centric world.

Figure 1:
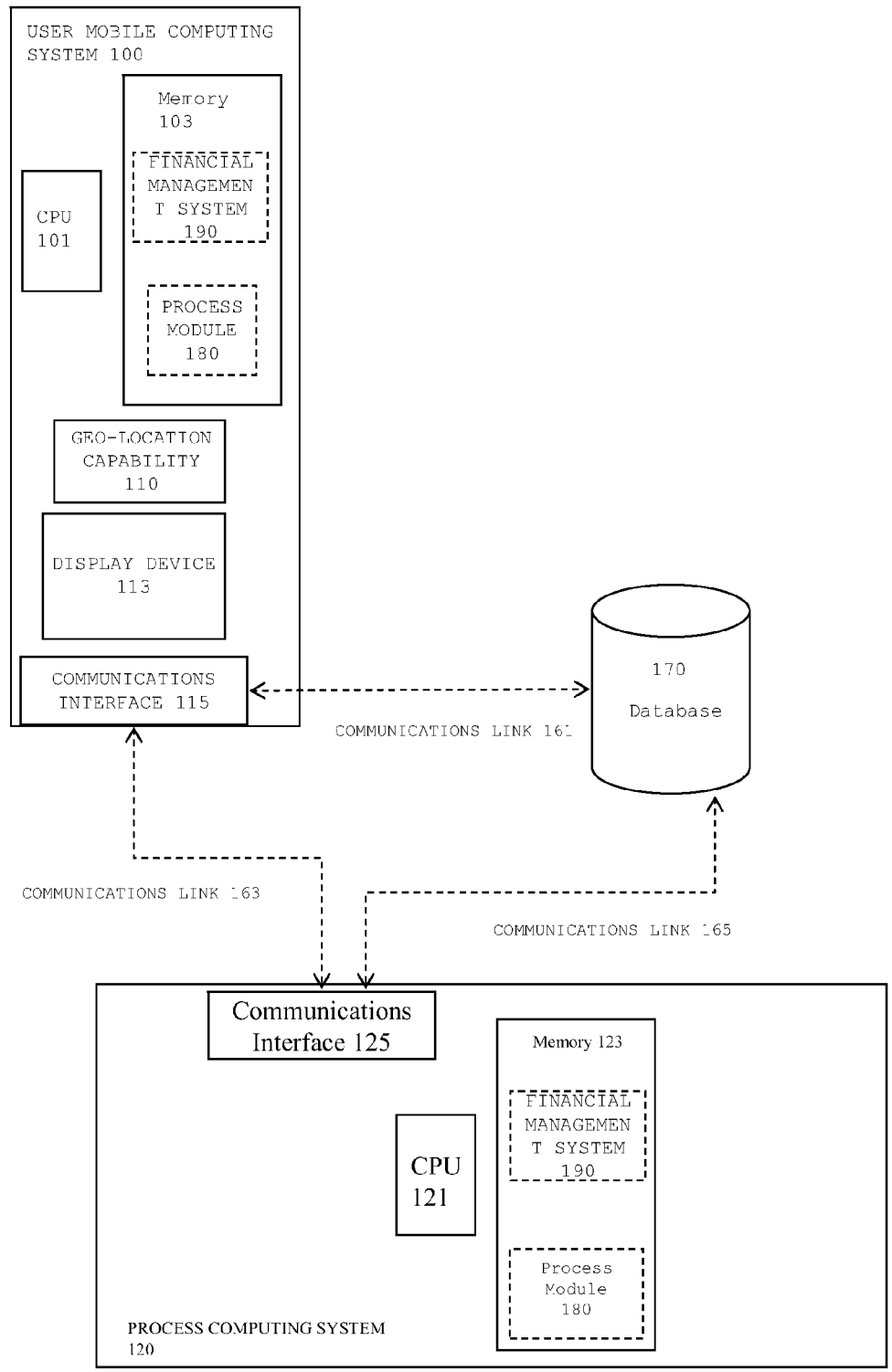
FIG. 1 is a block diagram of an exemplary hardware architecture for implementing one embodiment including a user mobile computing system, a process computing system, and a database, connected by various communications links/channels in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

In accordance with one embodiment, a system and method for automatically obtaining and categorizing cash transaction data using a mobile computing system includes a process for automatically obtaining and categorizing cash transaction data using a mobile computing system whereby one or more financial management systems are provided.

As noted above, several financial management systems are currently available to help an individual user, or an authorized party acting on behalf of an individual user, obtain a user's financial data, process/analyze the user's financial data, and generate various reports for the user.

Types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; or any of the numerous on-line, or web-based, or computing system implemented financial management systems as discussed herein, and/or as known in the art at the time of filing, and/or as developed after the time of filing.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; Mint.com™, available from Intuit Inc. of Mountain View, Calif.; Microsoft Money™, previously available from Microsoft, Inc. of Redmond, Wash.; or various other computing system implemented financial management systems discussed herein, or known to those of skill in the art at the time of filing, or as developed after the time of filing.

Currently, financial management systems typically help users manage their finances by providing a centralized interface with banks, credit card companies, and other various financial institutions, for electronically identifying and categorizing user financial transactions. Currently, financial management systems typically obtain electronic transaction based information, such as payee, payment amount, date, etc. via communication with banks, credit card providers, or other financial institutions, using electronic data transfer systems such as the Open Financial Exchange (OFX) specification, or various other systems for transferring financial transaction data.

A financial management system's ability to identify and categorize specific financial transactions is what allows the financial management system to provide the features that are usually of most interest to the user. Typically, the ability to categorize specific financial transactions is, in turn, dependent on an ability of the financial management system to obtain, and properly analyze, the data necessary to identify and categorize specific financial transactions.

Using some financial management systems, the electronic financial transaction data, such as payee, payment amount, date, etc. associated with a specific financial transaction is used by the financial management system to propose, and/or apply, a description to the specific financial transaction and/or a category to the specific financial transaction. As an example, if a given transaction has a gas station as the payee, the financial management system may apply a description of "gasoline purchase" and/or a category of "vehicle expense" to the financial transaction based solely on the payee being a location many people go to for gasoline.

As also noted above, currently, i.e., absent the process for automatically obtaining and categorizing cash transaction data using a mobile computing system, financial management systems work effectively with credit card, ATM card, and various other types of financial transactions involving "plastic" or other electronic data-based systems, but fail to offer an effective and simple mechanism to add cash transactions/expenses using a mobile applications and mobile computing systems. However, using the process for automatically obtaining and categorizing cash transaction data using a mobile computing system discussed herein, the user is provided a simple and efficient way to capture cash transaction data and integrate the cash transaction data into the one or more financial management systems.

In one embodiment, a user mobile computing system is provided that is accessible by the user and through which the user desires to capture cash transaction data for incorporation into, and/or processing by, the one or more financial management systems used by the user.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, the user mobile computing system is connected, and/or otherwise operably coupled, to one or more mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, one or more cash transaction triggers are defined which are used to indicate that a possible cash transaction is taking place, or has taken place, involving the user.

In various embodiments, the one or more cash transaction triggers include, but are not limited to: the user taking one or more deliberate actions to indicate that a cash transaction is taking place, such as activating an add transaction capability, via the user mobile computing system and/or a user interface device/action; geo-location and timer data indicating that the user is at a business location for a threshold amount of time; geo-location data and user financial transaction data indicating the user is at a business location historically frequented by the user and were cash transactions take place; geo-location data and date or time data indicating the user is at a business location at a time or date typically associated with cash transactions conducted by the user; and/or any other cash transaction trigger defined by the user and or the process for automatically obtaining and categorizing cash transaction data using a mobile computing system, as discussed herein, and/or as known/available at the time of filing, and/or as developed/made available after the time of filing.

As one illustrative example, in one embodiment, when the user conducts a cash-based financial transaction, the user activates a cash transaction trigger via the user's mobile computing system, and/or a mobile application associated with the process for automatically obtaining and categorizing cash transaction data using a mobile computing system, by clicking on an 'Add a Transaction' button.

In accordance with one embodiment, when a user starts up, logs-in to, or otherwise activates, the user mobile computing system, a designated mobile application that is, or is associated with, the process for automatically obtaining and categorizing cash transaction data using a mobile computing system, or a parent financial management system, the user is presented the option of allowing the process for automatically obtaining and categorizing cash transaction data using a mobile computing system to obtain and track the user's location data via geo-location data associated with the user mobile computing system.

In accordance with one embodiment, once a user permits geo-location tracking, e.g., activates the process for automatically obtaining and categorizing cash transaction data using a mobile computing system, the geo-location of the user mobile computing system, and presumably the user, is monitored.

In various embodiments, geo-location data indicating the position of the user mobile computing system is monitored by one or more processors associated with one or more computing systems. In one embodiment, geo-location data indicating the position of the user mobile computing system is monitored by the user mobile computing system and geo-location data is recorded/stored by the user mobile computing system.

In one embodiment, geo-location data indicating the position of the user mobile computing system is monitored by one or more processors associated with one or more computing systems other than the user mobile computing system, such as a process computing system.

As used herein, the term "computing system", includes, but is not limited to: a desktop computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the position of the user mobile computing system is monitored/tracked by obtaining data regarding the position of the user mobile computing system continuously, or at regular intervals, such as every second, every few seconds, every minute, every few minutes, etc., using one or more processors associated with one or more computing systems.

In one embodiment, the position of the user mobile computing system is monitored/tracked based on analysis of a communication signal emitted by the user mobile computing system and/or the relay stations used by the user mobile computing system.

In various embodiments, the position of the user mobile computing system is determined using a Global Positioning Satellite (GPS) system and/or a GPS capability provided with the one or more mobile devices.

In various embodiments, the position of the user mobile computing system is provided by the user mobile computing system itself via one or more data links.

In various embodiments, the position of the user mobile computing system is determined and/or provided by any method, means, mechanism, or procedure for determining a position of a user mobile computing system as discussed herein, and/or as known in the art at the time of filing, and/or as developed after the time of filing.

Numerous means, methods, mechanisms, procedures and processes are known in the art for determining the position of a user mobile computing system. Consequently, a more detailed discussion of any particular means, methods, mechanisms, procedures and processes for determining the position of a user mobile computing system is omitted here to avoid detracting from the invention.

In one embodiment, when at least one cash transaction trigger is detected, the geo-location of the user mobile computing system at the time of the cash transaction trigger detection is automatically recorded.

In various embodiments, a threshold proximity distance is defined such that if the geo-location data for the user mobile computing system indicates a position of the user mobile computing system within the threshold proximity distance of a given location, the user mobile computing system is considered to be at the location. In various embodiments, the threshold proximity distance is defined based on the accuracy of the geo-location data source.

In one embodiment, the recorded geo-location of the user mobile computing system at the time of the cash transaction trigger detection is used to identify/determine a business associated with, or closest to, the geo-location. In one embodiment, the recorded geo-location of the user mobile computing system at the time of the cash transaction trigger detection is used to identify/determine a business associated with, or closest to, the geo-location by analyzing/comparing the recorded geo-location of the user mobile computing system at the time of the cash transaction trigger with data in one or more databases mapping geo-location data to businesses located at the respective geo-locations, and/or products offered by the businesses located at the respective geo-locations.

Several databases that map geo-location data to businesses located at the respective geo-locations, and/or products offered by the businesses located at the respective geo-locations, are currently available, including, but not limited to: Google Maps™; Yellow Pages.com™; Quova™; and/or various GPS databases such as databases offered by TomTom™, Magellan™, Garmin™, etc.

In various embodiments, any one or more of the above sources mapping geo-location data to the businesses associated with the geo-location data, and/or any other sources mapping geo-location data to the businesses associated with the geo-location data, as discussed herein, and/or as known/available in the art at the time of filing, and/or as developed/made available after the time of filing, are used by the process for automatically obtaining and categorizing cash transaction data using a mobile computing system to identify/determine a business associated with, or closest to, the geo-location of the user mobile computing system at the time of the cash transaction trigger detection.

In one embodiment, data indicating businesses that do not accept cash, such as businesses that accept only checks, money orders, or other forms of payment that are not associated with electronic payment systems or cash, is collected and stored in one or more no-cash business databases or other data storage means. In one embodiment, the identified/determined business associated with the geo-location data of the mobile computing system at the time of the cash transaction trigger event is compared with the data indicating businesses that do not accept cash and, if the identified/determined business associated with the geo-location matches a known business that does not accept cash, it is assumed there was no cash based transaction associated with the cash transaction trigger event and cash transaction trigger event is ignored.

In one embodiment, a potential cash transaction entry for one or more of the one or more financial management systems is then automatically generated by the process for automatically obtaining and categorizing cash transaction data using a mobile computing system. In one embodiment, the potential cash transaction entry is automatically generated and includes description and/or categorization data for the potential cash transaction entry selected/determined based, at least in part, on the identified/determined business associated with the geo-location data of the mobile computing system at the time of the cash transaction trigger event.

For instance, if the identified/determined business associated with the geo-location data of the mobile computing system at the time of the cash transaction trigger event is a gas station, a potential cash transaction entry is automatically generated that includes the description "gasoline purchase" and/or categorization "automobile expenses".

Since, by definition, the transaction associated with the potential cash transaction entry automatically generated by the process for automatically obtaining and categorizing cash transaction data using a mobile computing system is a "cash" transaction, data indicating the amount of the potential cash transaction entry is not known, and must be obtained from the user as discussed below.

In one embodiment, data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other.

In one embodiment, data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, by one or more processors associated with one or more computing systems.

In one embodiment, data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and then stored in a memory associated with the user mobile computing system.

In one embodiment, data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and then stored in a memory associated with a computing system other than the user mobile computing system, such as a provider or process computing system.

In one embodiment, data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and then stored in any database, as discussed herein, and/or as known/available in the art at the time of filing, and/or as developed/made available after the time of filing.

As used herein, the term "database" includes any data storage mechanism known at the time of filing or as developed thereafter, such as, but not limited to: a data storage device; a designated server system or computing system, or a designated portion of one or more server systems or computing systems; a user mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In one embodiment, data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and then transferred from the user mobile computing system to the one or more other computing systems and/or a database using any means, method, process, procedure, or mechanism for transferring data from one or more devices, computing systems, server systems, databases, web site/web functions, or any devices having a data storage capability, to one or more other devices, computing systems, server systems, databases, web site/web functions, or any devices having a data storage capability, whether known at the time of filing or as thereafter developed.

In one embodiment, data representing one or more potential cash transaction entries is then provided to the user. In one embodiment, data representing the potential cash transaction entry is then provided to the user as a reminder of the potential cash transaction, and the need to enter the amount of the potential cash transaction.

For instance, as one specific illustrative example, in accordance with one embodiment, the process for automatically obtaining and categorizing cash transaction data using a mobile computing system records the business locations which user has visited between cash withdrawals at Automatic Teller Machines (ATMs), or any other source of cash withdrawals, and generates data representing one or more potential cash transaction entries for each business visited and/or for each visit. In accordance with one embodiment, at a later time, or at the time an ATM is used again, the process for automatically obtaining and categorizing cash transaction data using a mobile computing system alerts the user to add cash transaction amounts associated with the business locations, except debit/credit transactions.

In one embodiment, data representing one or more potential cash transaction entries is then provided to the user. In one embodiment, data representing the potential cash transaction entry is then provided to the user to obtain user approval, and/or input/edits, of the potential cash transaction entry, including the automatically entered description and/or categorization data for the potential cash transaction entry.

In one embodiment, if the potential cash transaction entry is approved, the user is also asked to provide data indicating the amount of the cash transaction.

In various embodiments, the approval/edits of the potential cash transaction entry and the data indicating the amount of the cash transaction is obtained through the user mobile computing system and one or more user interfaces and/or interface devices, or mechanisms, as discussed herein, and/or as known/available in the art at the time of filing, and/or as developed/made available after the time of filing.

In one embodiment, upon user approval, the potential cash transaction entry data, including the automatically entered description and/or categorization data for the potential cash transaction entry, and the amount data, is transformed into validated cash transaction entry data under the direction of one or more processors associated with one or more computing systems.

In one embodiment, the validated cash transaction entry data is then provided to one or more of the one or more financial management systems for processing and/or incorporation into one or more of the one or more financial management systems.

As one specific illustrative example, the process for automatically obtaining and categorizing cash transaction data using a mobile computing system is implemented on a user mobile computing system that is a mobile, or "smart" phone. In this specific illustrative example, when the user conducts a cash-based financial transaction, the user notifies the process for automatically obtaining and categorizing cash transaction data using a mobile computing system of the cash transaction event via the user's mobile phone, in one embodiment, by clicking on an 'Add a Transaction' button displayed on a display device associated with a mobile phone.

In this one illustrative example, process for automatically obtaining and categorizing cash transaction data using a mobile computing system then presents the user with a cash transaction data entry form and automatically fills in the transaction description field and the transaction category field based on the user's current position data, and/or recorded geo-location data indicating the closest, or last, user location associated with a business.

In one embodiment, using the system and method for automatically obtaining and categorizing cash transaction data using a mobile computing system all the user has to do is enter the amount of the cash transaction and review and approve the automatically filled in transaction description data and transaction category data.

As another specific illustrative example of one embodiment, when a user starts up, logs-in to, or otherwise activates, a mobile computing system, mobile application, or a parent financial management system, the process for automatically obtaining and categorizing cash transaction data using a mobile computing system presents the user the option of allowing the system and method for automatically obtaining and categorizing cash transaction data using a mobile computing system to obtain and track the user's location data. In this specific illustrative example of one embodiment, it is stipulated that the user permits location tracking, i.e., activates the system and method for automatically obtaining and categorizing cash transaction data using a mobile computing system.

In this specific illustrative example of one embodiment, it is stipulated that the user conducts a cash-based financial transaction at a fast-food drive through location and the user pays for the food using cash.

In one embodiment, the process for automatically obtaining and categorizing cash transaction data using a mobile computing system determines that the user mobile phone is at a geo-location associated with the fast food restaurant and that the user mobile phone is at the geo-location associated with the fast food restaurant for a threshold period of time, and/or, that the fast food restaurant is one frequented by the user and often involves cash transactions. As a result, a cash transaction trigger event is identified.

Then, either at the time the user pays for the food, or at a later time, the system and method for automatically obtaining and categorizing cash transaction data using a mobile computing system presents the user with a cash transaction data entry form and automatically fills in the transaction description field as "fast food purchase" and the transaction category field as "dinning/food" based on the user's recorded geo-location data, indicating the user was near was the fast food location at the time of the cash transaction trigger event.

In this specific illustrative example of one embodiment, all the user then has to do is enter the amount of the cash transaction and review and approve the automatically filled in transaction description data and transaction category data.

Using the system and method for automatically obtaining and categorizing cash transaction data using a mobile computing system, instead of a user having to manually enter cash transaction data and details such as the transaction 'description' and 'category', the transaction data is obtained automatically based on where the user is/was located at the time of the transaction and/or business locations visited by the user in a defined period. The system and method for automatically obtaining and categorizing cash transaction data using a mobile computing system then alerts user to add the cash transaction, and/or the transaction data is presented to the user for approval so that all the user has to do is enter the amount and indicate user approval. Therefore, using the system and method for automatically obtaining and categorizing cash transaction data using a mobile computing system, financial management systems are easier to use and incorporate in a largely mobile computing system centric world.

Those of skill in the art will readily recognize that the specific examples above were provided for illustrative purposes only and that numerous other uses and/or applications of the method and system for automatically obtaining and categorizing cash transaction data using a mobile computing system are possible, and are envisioned. Consequently, the specific examples discussed above do not limit the scope of the claims presented below.

Hardware Architecture

FIG. 1 is a block diagram of an exemplary hardware architecture for implementing one embodiment of a system and method for automatically obtaining and categorizing cash transaction data using a mobile computing system, such as exemplary process 300 discussed herein, that, returning to FIG. 1, includes: a user mobile computing system 100, i.e., a first computing system; a process computing system 120, e.g. a second computing system; and a database 170, all operatively coupled by communication links/channels 161, 163, and 165.

As noted above, herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

As seen in FIG. 1, in one embodiment, user mobile computing system includes a central processing unit (CPU) 101; geo-location capability 110; a display device 113; a communications interface 115; and a memory system 103.

User mobile computing system 100 may further include standard user interface devices such as a keyboard (not shown), a mouse (not shown), a touch pad (not shown) as well as, one or more standard input/output (I/O) devices (not shown).

As seen in FIG. 1, in one embodiment, memory system 103 includes process module 180 and, optionally, all, or part of, financial management system 190, such as any computing system implemented financial management system discussed herein, and/or known/available in the art at the time of filing, and/or developed/made available after the time of filing.

In one embodiment, user mobile computing system 100 is connected, and/or otherwise operably coupled, to one or more communications links/channels, such as communications links/channels 161 and 163, and/or mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Also shown in FIG. 1 is optional process computing system 120. In various embodiments, process computing system 120 is under the control of, accessible by, or otherwise associated with, a provider of process for automatically obtaining and categorizing cash transaction data using a mobile computing system and is used to implement at least part of a process for automatically obtaining and categorizing cash transaction data using a mobile computing system.

As shown in FIG. 1, process computing system 120 typically includes a central processing unit (CPU) 121, communications interface 125, and a memory system 123.

As seen in FIG. 1, in one embodiment, memory system 123 includes process module 180 and, optionally, all, or part of, financial management system 190, such as any on-line implemented financial management system discussed herein, and/or known/available in the art at the time of filing, and/or developed/made available after the time of filing.

Process computing system may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process computing system 120, whether available or known at the time of filing or as later developed.

As noted above, as used herein, the term "computing system" includes, but is not limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, process computing system 120 is representative of two or more computing systems. In one embodiment, process computing system 120 is a client computing system associated with one or more server computing systems. In one embodiment, process computing system 120 is a server computing system that is, in turn, associated with one or more client computing systems. In one embodiment, process computing system 120 is part of a cloud computing environment.

In one embodiment, process computing system 120 is operatively coupled to user mobile computing system 100 via communications link/channel 163.

Also shown in FIG. 1 is database 170. In one embodiment, database 170 is representative of one or more databases mapping geo-location data to businesses located at the respective geo-locations, and/or products offered by the businesses located at the respective geo-locations such as, but not limited to: Google Maps™; Yellow Pages.com™; Quova™; and/or various GPS databases such as databases offered by TomTom™, Magellan™, Garmin™, etc.

In one embodiment, database 170 includes all, or part of, data indicating one or more potential cash transaction entries, and/or data indicating businesses determined to be associated with one or more potential cash transaction entries, and/or the geo-location data associated with one or more potential cash transaction entries, and/or data indicating cash transaction triggers associated with one or more potential cash transaction entries.

In one embodiment, database 170 is a data storage device, a designated server system or computing system, or a designated portion of one or more server systems or computing systems, such as computing system(s) 100 and/or 120, or a distributed database, or an external and/or portable hard drive. In one embodiment, database 170 is a dedicated mass storage device implemented in software, hardware, or a combination of hardware and software.

In one embodiment, database 170 is a web-based function. As discussed in more detail below, in one embodiment, database 170 is under the control of, or otherwise accessible by, a process for automatically obtaining and categorizing cash transaction data using a mobile computing system. In one embodiment, database 170 is part of a cloud computing environment.

In various embodiments, user mobile computing system 100, and/or process computing system 120, and/or database 170, are all operatively coupled by communication links/channels 161, 163, and 165. In various embodiments, any, or all, of communication links/channels 161, 163, and 165 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In one embodiment, user mobile computing system 100, and/or process computing system 120, and/or database 170, are part of any cloud computing environment.

Those of skill in the art will readily recognize that the components shown in FIG. 1, and their respective sub-components, are shown for illustrative purposes only and that architectures with more or fewer components can implement, and benefit from, the invention. Moreover, one or more components of FIG. 1 may be located remotely from their respective system and accessed via any network, as discussed herein. In addition, the particular type of, and configuration of, user mobile computing system 100, process computing system 120, and database 170 are not relevant.

Figure 2:
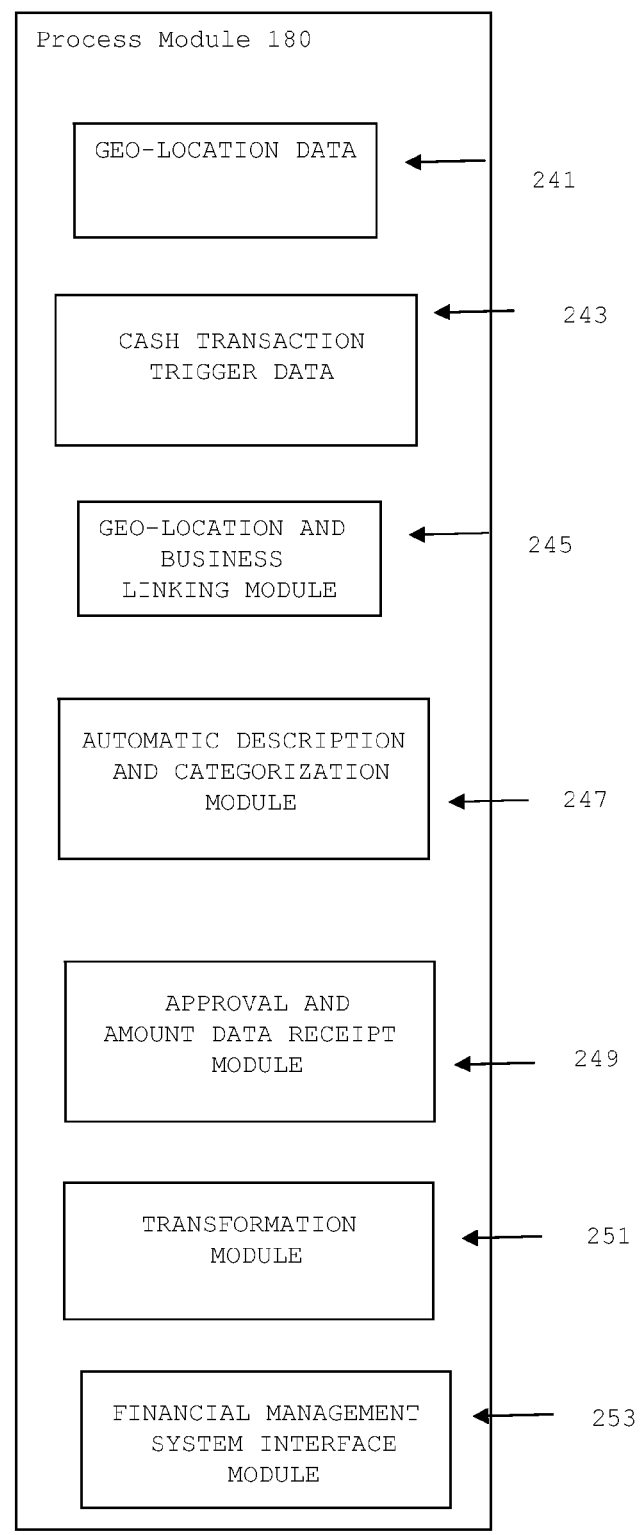
FIG. 2 is a block diagram of an exemplary memory system process module associated with the user mobile computing system and/or process computing system of FIG. 1, in accordance with one embodiment.

FIG. 2 shows a more detailed block diagram of process module 180 of FIG. 1. As seen in FIG. 2, process module 180 can store data and/or instructions associated with, but not limited to, a process for automatically obtaining and categorizing cash transaction data using a mobile computing system, such as process 300 of FIG. 3.

As also seen in FIG. 2, process module 180 includes geo-location data 241 that includes procedures, data, and/or instructions, for obtaining and/or storing geo-location data and/or use location data indicating the position of user mobile computing system 100 (FIG. 1).

As also seen in FIG. 2, in one embodiment, process module 180 includes cash transaction trigger data 243 that includes procedures, data, and/or instructions, for obtaining, and/or storing data representing one or more cash transaction triggers which are used to indicate that a possible cash transaction is taking place, or has taken place, involving the user.

In various embodiments, the one or more cash transaction triggers of cash transaction trigger data 243 are monitored and include, but are not limited to: the user taking one or more deliberate actions to indicate that a cash transaction is taking place, such as activating an add transaction capability, via the user mobile computing system and/or a user interface device/action; geo-location and timer data indicating that the user is at a business location for a threshold amount of time; geo-location data and user financial transaction data indicating the user is at a business location historically frequented by the user and were cash transactions take place; geo-location data and date or time data indicating the user is at a business location at a time or date typically associated with cash transactions conducted by the user; and/or any other cash transaction trigger defined by the user and or the process for automatically obtaining and categorizing cash transaction data using a mobile computing system, as discussed herein, and/or as known/available at the time of filing, and/or as developed/made available after the time of filing.

As also seen in FIG. 2, in one embodiment, process module 180 includes geo-location and business linking module 245 that includes procedures, data, and/or instructions, for determining businesses associated with the geo-location data 241 obtained at the time a cash transaction trigger, or defined combination of cash transaction triggers, of cash transaction trigger data 243 is/are detected.

As also seen in FIG. 2, in one embodiment, process module 180 includes automatic description and categorization module 247 that includes procedures, data, and/or instructions, for generating a potential cash transaction entry for one or more financial management systems including description and/or categorization data for the potential cash transaction entry selected/determined based, at least in part, on the identified/determined business associated with the geo-location data of the mobile computing system at the time of the cash transaction trigger event of geo-location and business linking module 245.

As also seen in FIG. 2, in one embodiment, process module 180 includes approval and amount data receipt module 249 that includes procedures, data, and/or instructions, for obtaining user approval, and/or input/edits, of the potential cash transaction entry, including the automatically entered description and/or categorization data for the potential cash transaction entry, and for obtaining user input indicating the amount of the approved cash transaction entry.

As also seen in FIG. 2, in one embodiment, process module 180 includes transformation module 251 that includes procedures, data, and/or instructions, for when, and if, user approval, and/or input/edits, of the potential cash transaction entry, and user input indicating the amount of the approved cash transaction entry is obtained at approval and amount data receipt module 249, transforming the potential cash transaction entry data, including the automatically entered description and/or categorization data for the potential cash transaction entry of automatic description and categorization module 247, and the amount data, into validated cash transaction entry data.

As also seen in FIG. 2, in one embodiment, process module 180 includes financial management system interface module that includes procedures, data, and/or instructions, for, providing the validated cash transaction entry data to one or more financial management systems for processing and/or incorporation into one or more of the one or more financial management systems.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

Process

In accordance with one embodiment, a system and method for automatically obtaining and categorizing cash transaction data using a mobile computing system includes a process for automatically obtaining and categorizing cash transaction data using a mobile computing system whereby one or more financial management systems are provided as well as a user mobile computing system. In one embodiment, one or more cash transaction triggers are defined which are used to indicate that a possible cash transaction is taking place, or has taken place, involving the user. In one embodiment, the geo-location of the user mobile computing system, and presumably the user, is monitored. In one embodiment, when at least one cash transaction trigger is detected, the geo-location of the user mobile computing system at the time of the cash transaction trigger detection is automatically recorded and used to identify/determine a business associated with, or closest to, the geo-location. In one embodiment, a potential cash transaction entry is then automatically generated including description and/or categorization data for the potential cash transaction entry selected/determined based, at least in part, on the identified/determined business. In one embodiment, data representing the potential cash transaction entry is then provided to the user as a reminder of the potential cash transaction and/or to obtain user approval of the potential cash transaction entry, including the automatically entered description and/or categorization data for the potential cash transaction entry. In one embodiment, if the potential cash transaction entry is approved, the user is also asked to provide data indicating the amount of the cash transaction. In one embodiment, upon user approval, the potential cash transaction entry data, including the automatically entered description and/or categorization data for the potential cash transaction entry, and the amount data, is transformed into validated cash transaction entry data and the validated cash transaction entry is provided to the one or more financial management systems for processing.

Figure 3:
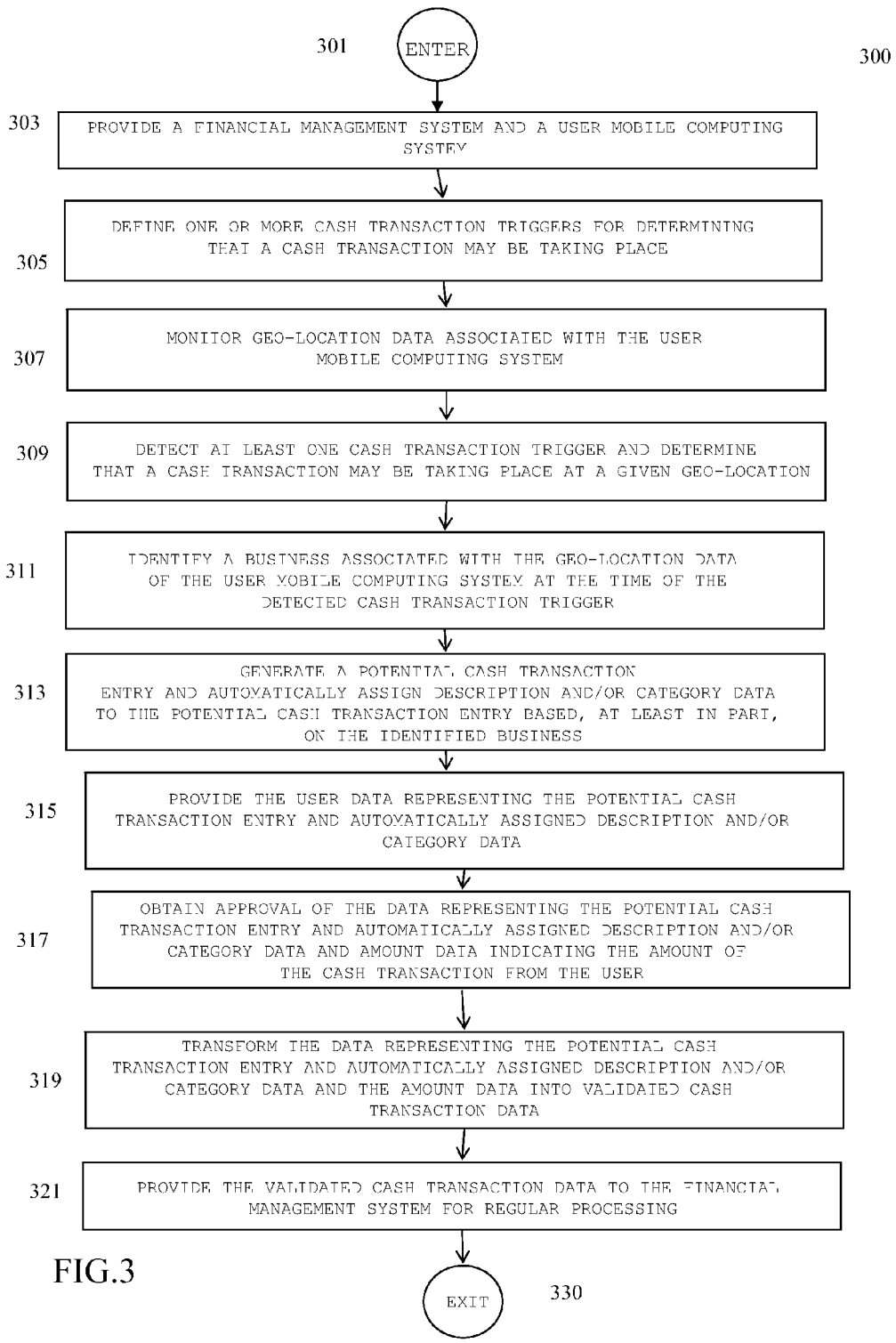
FIG. 3 is a flow chart depicting one embodiment of a process for automatically obtaining and categorizing cash transaction data using a mobile computing system in accordance with one embodiment.

FIG. 3 is a flow chart depicting a process for automatically obtaining and categorizing cash transaction data using a mobile computing system 300 in accordance with one embodiment. Process for automatically obtaining and categorizing cash transaction data using a mobile computing system 300 begins at ENTER OPERATION 301 of FIG. 3 and process flow proceeds to PROVIDE A FINANCIAL MANAGEMENT SYSTEM AND A USER MOBILE COMPUTING SYSTEM OPERATION 303.

In one embodiment, at PROVIDE A FINANCIAL MANAGEMENT SYSTEM AND A USER MOBILE COMPUTING SYSTEM OPERATION 303 one or more financial management systems are provided.

As noted above, several financial management systems are currently available to help an individual user, or an authorized party acting on behalf of an individual user, obtain a user's financial data, process/analyze the user's financial data, and generate various reports for the user.

Types of financial management systems currently available include, but are not limited to any of the following: an on-line, or web-based, or computing system implemented personal or business financial management system, package, program, module, or application; an on-line, or web-based, or computing system implemented home or business inventory system, package, program, module, or application; an on-line, or web-based, or computing system implemented personal or business asset management system, package, program, module, or application; an on-line, or web-based, or computing system implemented personal or business accounting system, package, program, module, or application; or any of the numerous on-line, or web-based, or computing system implemented financial management systems as discussed herein, and/or as known in the art at the time of filing, and/or as developed after the time of filing.

Specific examples of financial management systems currently available include, but are not limited to: Quicken™, available from Intuit Inc. of Mountain View, Calif.; Quicken Online™, available from Intuit Inc. of Mountain View, Calif.; QuickBooks™, available from Intuit Inc. of Mountain View, Calif.; Mint.com™, available from Intuit Inc. of Mountain View, Calif.; Microsoft Money™, previously available from Microsoft, Inc. of Redmond, Wash.; or various other computing system implemented financial management systems discussed herein, or known to those of skill in the art at the time of filing, or as developed after the time of filing.

Currently, financial management systems typically help users manage their finances by providing a centralized interface with banks, credit card companies, and other various financial institutions, for electronically identifying and categorizing user financial transactions. Currently, financial management systems typically obtain electronic transaction based information, such as payee, payment amount, date, etc. via communication with banks, credit card providers, or other financial institutions, using electronic data transfer systems such as the Open Financial Exchange (OFX) specification, or various other systems for transferring financial transaction data.

As noted above, a financial management system's ability to identify and categorize specific financial transactions is what allows the financial management system to provide the features that are usually of most interest to the user. Typically, the ability to categorize specific financial transactions is, in turn, dependent on an ability of the financial management system to obtain, and properly analyze, the data necessary to identify and categorize specific financial transactions.

Using some financial management systems, the electronic financial transaction data, such as payee, payment amount, date, etc. associated with a specific financial transaction is used by the financial management system to propose, and/or apply, a description to the specific financial transaction and/or a category to the specific financial transaction. As an example, if a given transaction that has a gas station as the payee, the financial management system may apply a description of "gasoline purchase" and/or a category of "vehicle expense" to the financial transaction based solely on the payee being a location many people go to for gasoline.

As also noted above, currently, i.e., absent process for automatically obtaining and categorizing cash transaction data using a mobile computing system 300, financial management systems work effectively with credit card, ATM card, and various other types of financial transactions involving "plastic" or other electronic data-based systems, but fail to offer an effective and simple mechanism to add cash transactions/expenses using a mobile applications and mobile computing systems. However, using process for automatically obtaining and categorizing cash transaction data using a mobile computing system 300 discussed herein, the user is provided a simple and efficient way to capture cash transaction data and integrate the cash transaction data into the one or more financial management systems.

In one embodiment, at PROVIDE A FINANCIAL MANAGEMENT SYSTEM AND A USER MOBILE COMPUTING SYSTEM OPERATION 303 a user mobile computing system is provided that is accessible by the user, and through which the user desires to capture cash transaction data for incorporation into, and/or processing by, the one or more financial management systems used by the user.

Herein, the terms "mobile computing system" and "mobile device" are used interchangeably and include, but are not limited to: a smart phone; a cellular phone; a digital wireless telephone; a tablet computing system; a notebook computing system; any portable computing system; a two-way pager; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, at PROVIDE A FINANCIAL MANAGEMENT SYSTEM AND A USER MOBILE COMPUTING SYSTEM OPERATION 303 a user mobile computing system, such as user mobile computing system 100 of FIG. 1, is provided.

In one embodiment, the user mobile computing system is connected, and/or otherwise operably coupled, to one or more communications links/channels, such as communications links/channels 161 and/or 163 of FIG. 1, and/or mobile communication networks and/or other networks, such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 3, once one or more financial management systems and a user mobile computing system are provided at PROVIDE A FINANCIAL MANAGEMENT SYSTEM AND A USER MOBILE COMPUTING SYSTEM OPERATION 303, process flow proceeds to DEFINE ONE OR MORE CASH TRANSACTION TRIGGERS FOR DETERMINING THAT A CASH TRANSACTION MAY BE TAKING PLACE OPERATION 305.

In one embodiment, at DEFINE ONE OR MORE CASH TRANSACTION TRIGGERS FOR DETERMINING THAT A CASH TRANSACTION MAY BE TAKING PLACE OPERATION 305 one or more cash transaction triggers are defined which are used to indicate that a possible cash transaction is taking place, or has taken place, involving the user.

In various embodiments, the one or more cash transaction triggers include, but are not limited to: the user taking one or more deliberate actions to indicate that a cash transaction is taking place, such as activating an add transaction capability, via the user mobile computing system and/or a user interface device/action; geo-location and timer data indicating that the user is at a business location for a threshold amount of time; geo-location data and user financial transaction data indicating the user is at a business location historically frequented by the user and historically were cash transactions take place; geo-location data and date or time data indicating the user is at a business location at a time or date historically/typically associated with cash transactions conducted by the user; and/or any other cash transaction trigger defined by the user and or the process for automatically obtaining and categorizing cash transaction data using a mobile computing system, as discussed herein, and/or as known/available at the time of filing, and/or as developed/made available after the time of filing.

As one illustrative example, in one embodiment, when the user conducts a cash-based financial transaction, the user activates a cash transaction trigger via the user's mobile computing system of PROVIDE A FINANCIAL MANAGEMENT SYSTEM AND A USER MOBILE COMPUTING SYSTEM OPERATION 303, and/or a mobile application associated with process for automatically obtaining and categorizing cash transaction data using a mobile computing system 300, by clicking on an 'Add a Transaction' button.

In one embodiment, once one or more cash transaction triggers are defined which are used to indicate that a possible cash transaction is taking place, or has taken place, involving the user at DEFINE ONE OR MORE CASH TRANSACTION TRIGGERS FOR DETERMINING THAT A CASH TRANSACTION MAY BE TAKING PLACE OPERATION 305, process flow proceeds to MONITOR GEO-LOCATION DATA ASSOCIATED WITH THE USER MOBILE COMPUTING SYSTEM OPERATION 307.

In one embodiment, at MONITOR GEO-LOCATION DATA ASSOCIATED WITH THE USER MOBILE COMPUTING SYSTEM OPERATION 307 geo-location data indicating the position of the user mobile computing system of PROVIDE A FINANCIAL MANAGEMENT SYSTEM AND A USER MOBILE COMPUTING SYSTEM OPERATION 303 is monitored and/or recorded.

In accordance with one embodiment, when a user starts up, logs-in to, or otherwise activates, the user mobile computing system, a designated mobile application that is, or is associated with, process for automatically obtaining and categorizing cash transaction data using a mobile computing system 300, or a parent financial management system, the user is presented the option of allowing process for automatically obtaining and categorizing cash transaction data using a mobile computing system 300 to obtain and track the user's location data via geo-location data associated with the user mobile computing system.

In accordance with one embodiment, once a user permits geo-location tracking, e.g., activates the process for automatically obtaining and categorizing cash transaction data using a mobile computing system, the geo-location of the user mobile computing system, and presumably the user, is monitored.

In various embodiments, at MONITOR GEO-LOCATION DATA ASSOCIATED WITH THE USER MOBILE COMPUTING SYSTEM OPERATION 307 geo-location data indicating the position of the user mobile computing system is monitored by one or more processors, such as CPU 101 and/or CPU 121 of FIG. 1, associated with one or more computing systems, such as user mobile computing system 100 and/or process computing system 120 of FIG. 1.

Returning to FIG. 3, in one embodiment, at MONITOR GEO-LOCATION DATA ASSOCIATED WITH THE USER MOBILE COMPUTING SYSTEM OPERATION 307 geo-location data indicating the position of the user mobile computing system is monitored by the user mobile computing system and geo-location data, such as geo-location data 241 of FIG. 2, is recorded/stored by user mobile computing system 100.

Returning to FIG. 3, in one embodiment, at MONITOR GEO-LOCATION DATA ASSOCIATED WITH THE USER MOBILE COMPUTING SYSTEM OPERATION 307 geo-location data indicating the position of the user mobile computing system is monitored by one or more processors, such as CPU 121 of FIG. 1, associated with one or more computing systems other than the user mobile computing system, such as process computing system 120 of FIG. 1.

Returning to FIG. 3, in one embodiment, at MONITOR GEO-LOCATION DATA ASSOCIATED WITH THE USER MOBILE COMPUTING SYSTEM OPERATION 307 the position of the user mobile computing system is monitored/tracked by obtaining data regarding the position of the user mobile computing system at regular intervals, such as every second, every few seconds, every minute, every few minutes, etc., using one or more processors associated with one or more computing systems, such as user mobile computing system 100 and/or process computing system 120 of FIG. 1.

Returning to FIG. 3, in one embodiment, at MONITOR GEO-LOCATION DATA ASSOCIATED WITH THE USER MOBILE COMPUTING SYSTEM OPERATION 307 the position of the user mobile computing system is monitored/tracked based on analysis of a communication signal emitted by the user mobile computing system and/or the relay stations used by the user mobile computing system.

In various embodiments, at MONITOR GEO-LOCATION DATA ASSOCIATED WITH THE USER MOBILE COMPUTING SYSTEM OPERATION 307 the position of the user mobile computing system is determined using a Global Positioning Satellite (GPS) system and/or a GPS capability, such as geo-location capability 110 of FIG. 1, provided with user mobile computing system 100.

Returning to FIG. 3, in one embodiment, at MONITOR GEO-LOCATION DATA ASSOCIATED WITH THE USER MOBILE COMPUTING SYSTEM OPERATION 307, the position of the user mobile computing system is provided by the user mobile computing system itself via one or more data links and/or communication links/channels, such as communications links/channels 161 and/or 165 of FIG. 1.

Returning to FIG. 3, in various embodiments, at MONITOR GEO-LOCATION DATA ASSOCIATED WITH THE USER MOBILE COMPUTING SYSTEM OPERATION 307 the position of the user mobile computing system is determined and/or provided by any method, means, mechanism, or procedure for determining a position of a user mobile computing system as discussed herein, and/or as known in the art at the time of filing, and/or as developed after the time of filing.

Numerous means, methods, mechanisms, procedures and processes are known in the art for determining the position of a user mobile computing system. Consequently, a more detailed discussion of any particular means, methods, mechanisms, procedures and processes for determining the position of a user mobile computing system is omitted here to avoid detracting from the invention.

In one embodiment, once geo-location data indicating the position of the user mobile computing system is being monitored and/or recorded at MONITOR GEO-LOCATION DATA ASSOCIATED WITH THE USER MOBILE COMPUTING SYSTEM OPERATION 307, process flow proceeds to DETECT AT LEAST ONE CASH TRANSACTION TRIGGER AND DETERMINE THAT A CASH TRANSACTION MAY BE TAKING PLACE AT A GIVEN GEO-LOCATION OPERATION 309.

In one embodiment, at DETECT AT LEAST ONE CASH TRANSACTION TRIGGER AND DETERMINE THAT A CASH TRANSACTION MAY BE TAKING PLACE AT A GIVEN GEO-LOCATION OPERATION 309 when at least one cash transaction trigger is detected, the geo-location of the user mobile computing system at the time of the cash transaction trigger detection is automatically recorded.

In one embodiment, at DETECT AT LEAST ONE CASH TRANSACTION TRIGGER AND DETERMINE THAT A CASH TRANSACTION MAY BE TAKING PLACE AT A GIVEN GEO-LOCATION OPERATION 309 when at least one cash transaction trigger is detected, the geo-location of the user mobile computing system at the time of the cash transaction trigger detection is automatically recorded under the direction of one or more processors, such as CPU 101 and/or CPU 121 of FIG. 1, associated with one or more computing systems, such as user mobile computing system 100 and/or process computing system 120 of FIG. 1.

Returning to FIG. 3, once at least one cash transaction trigger is detected and the geo-location of the user mobile computing system at the time of the cash transaction trigger detection is automatically recorded at DETECT AT LEAST ONE CASH TRANSACTION TRIGGER AND DETERMINE THAT A CASH TRANSACTION MAY BE TAKING PLACE AT A GIVEN GEO-LOCATION OPERATION 309, process flow proceeds to IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311.

In one embodiment, at IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311 the recorded geo-location of the user mobile computing system at the time of the cash transaction trigger detection of DETECT AT LEAST ONE CASH TRANSACTION TRIGGER AND DETERMINE THAT A CASH TRANSACTION MAY BE TAKING PLACE AT A GIVEN GEO-LOCATION OPERATION 309 is used to identify/determine a business associated with, or closest to, the geo-location.

In various embodiments, at IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311 a threshold proximity distance is defined such that if the geo-location data for the user mobile computing system indicates a position of the user mobile computing system within the threshold proximity distance of a given location, the user mobile computing system is considered to be at the location. In various embodiments, the threshold proximity distance is defined based on the accuracy of the geo-location data source.

In various embodiments, the threshold proximity distance is defined at IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311 by the provider of process for automatically obtaining and categorizing cash transaction data using a mobile computing system.

In various embodiments, the threshold proximity distance is defined at IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311 by the user of process for automatically obtaining and categorizing cash transaction data using a mobile computing system 300.

In one embodiment, at IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311 the recorded geo-location of the user mobile computing system at the time of the cash transaction trigger detection is used to identify/determine a business associated with, or closest to, the geo-location by analyzing/comparing the recorded geo-location of the user mobile computing system at the time of the cash transaction trigger with data in one or more databases mapping geo-location data to businesses located at the respective geo-locations, and/or products offered by the businesses located at the respective geo-locations.

Several databases that map geo-location data to businesses located at the respective geo-locations, and/or products offered by the businesses located at the respective geo-locations, are currently available, including, but not limited to: Google Maps™; Yellow Pages.com™; Quova™; and/or various GPS databases such as databases offered by TomTom™, Magellan™, Garmin™, etc.

In various embodiments, any one or more of the above sources mapping geo-location data to the businesses associated with the geo-location data, and/or any other sources mapping geo-location data to the businesses associated with the geo-location data, as discussed herein, and/or as known/available in the art at the time of filing, and/or as developed/made available after the time of filing, are used by process for automatically obtaining and categorizing cash transaction data using a mobile computing system 300 to identify/determine a business associated with, or closest to, the geo-location of the user mobile computing system at the time of the cash transaction trigger detection.

In one embodiment, the recorded geo-location of the user mobile computing system at the time of the cash transaction trigger detection is used to identify/determine a business associated with, or closest to, the geo-location by analyzing/comparing the recorded geo-location of the user mobile computing system at the time of the cash transaction trigger with data in one or more databases mapping geo-location data to businesses located at the respective geo-locations, and/or products offered by the businesses located at the respective geo-locations, such as database 170 of FIG. 1, under the direction of one or more processors, such as CPU 101 and/or CPU 121 of FIG. 1, associated with one or more computing systems, such as user mobile computing system 100 and/or process computing system 120 of FIG. 1.

Returning to FIG. 3, in one embodiment, once the recorded geo-location of the user mobile computing system at the time of the cash transaction trigger detection of DETECT AT LEAST ONE CASH TRANSACTION TRIGGER AND DETERMINE THAT A CASH TRANSACTION MAY BE TAKING PLACE AT A GIVEN GEO-LOCATION OPERATION 309 is used to identify/determine a business associated with, or closest to, the geo-location at IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311, process flow proceeds to GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313.

In one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 a potential cash transaction entry for one or more of the one or more financial management systems of PROVIDE A FINANCIAL MANAGEMENT SYSTEM AND A USER MOBILE COMPUTING SYSTEM OPERATION 303 is automatically generated by process for automatically obtaining and categorizing cash transaction data using a mobile computing system 300.

In one embodiment, the potential cash transaction entry is automatically generated and includes description and/or categorization data for the potential cash transaction entry selected/determined based, at least in part, on the identified/determined business associated with the geo-location data of the mobile computing system at the time of the cash transaction trigger event of IDENTIFY A BUSINESS ASSOCIATED WITH THE GEO-LOCATION DATA OF THE USER MOBILE COMPUTING SYSTEM AT THE TIME OF THE DETECTED CASH TRANSACTION TRIGGER OPERATION 311.

For instance, if the identified/determined business associated with the geo-location data of the mobile computing system at the time of the cash transaction trigger event is a gas station, a potential cash transaction entry is automatically generated that includes the description "gasoline purchase" and/or categorization "automobile expenses".

In one embodiment, the potential cash transaction entry for the one or more financial management systems is automatically generated by process for automatically obtaining and categorizing cash transaction data using a mobile computing system 300 under the direction of one or more processors, such as CPU 101 and/or CPU 121 of FIG. 1, associated with one or more computing systems, such as user mobile computing system 100 and/or process computing system 120 of FIG. 1.

Returning to FIG. 3, by definition, the transaction associated with the potential cash transaction entry automatically generated by process for automatically obtaining and categorizing cash transaction data using a mobile computing system 300 is a "cash" transaction. Consequently, data indicating the amount of the potential cash transaction entry is not known, and must be obtained from the user as discussed below.

In one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other.

In one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, by one or more processors, such as CPU 101 and/or CPU 121 of FIG. 1, associated with one or more computing systems, such as user mobile computing system 100 and/or process computing system 120 of FIG. 1.

Returning to FIG. 3, in one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and stored in a memory associated with the user mobile computing system, such as memory 103 of FIG. 1, and process module 180 of FIGS. 1 and 2.

Returning to FIG. 3, in one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and stored in a memory associated with a computing system other than the user mobile computing system, such as memory 123 of FIG. 1, and process module 180 of FIGS. 1 and 2.

Returning to FIG. 3, in one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and then stored in stored in any database, as discussed herein, such as database 170 of FIG. 1, and/or as known/available in the art at the time of filing, and/or as developed/made available after the time of filing.

Returning to FIG. 3, in one embodiment, at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313 data indicating the potential cash transaction entry, and/or data indicating the business determined to be associated with the potential cash transaction entry, and/or the geo-location data associated with the potential cash transaction entry, and/or data indicating the cash transaction trigger associated with the potential cash transaction entry, are linked to each other, mapped to each other, or otherwise associated with each other, and then transferred from the user mobile computing system to the one or more other computing systems and/or a database using any means, method, process, procedure, or mechanism for transferring data from one or more devices, computing systems, server systems, databases, web site/web functions, or any devices having a data storage capability, to one or more other devices, computing systems, server systems, databases, web site/web functions, or any devices having a data storage capability, whether known at the time of filing or as thereafter developed.

In one embodiment, once a potential cash transaction entry for one or more of the one or more financial management systems of PROVIDE A FINANCIAL MANAGEMENT SYSTEM AND A USER MOBILE COMPUTING SYSTEM OPERATION 303 is automatically generated by process for automatically obtaining and categorizing cash transaction data using a mobile computing system 300 at GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313, process flow proceeds to PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315.

In one embodiment, at PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315 data representing one or more potential cash transaction entries is provided to the user.

In one embodiment, at PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315 data representing the potential cash transaction entry is provided to the user as a reminder of the potential cash transaction, and the need to enter the amount of the potential cash transaction.

For instance, as one specific illustrative example, in accordance with one embodiment, process for automatically obtaining and categorizing cash transaction data using a mobile computing system 300 records the business locations which user has visited between cash withdrawals at Automatic Teller Machines (ATMs), or any other source of cash withdrawals, and generates data representing one or more potential cash transaction entries for each business visited and/or for each visit. In accordance with one embodiment, at a later time, or at the time an ATM is used again, the process for automatically obtaining and categorizing cash transaction data using a mobile computing system alerts the user to add cash transaction amounts associated with the business locations, except debit/credit transactions.

In one embodiment, once data representing one or more potential cash transaction entries is provided to the user at PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315, process flow proceeds to OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317.

In one embodiment, at OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317 data representing the potential cash transaction entry of GENERATE A POTENTIAL CASH TRANSACTION ENTRY AND AUTOMATICALLY ASSIGN DESCRIPTION AND/OR CATEGORY DATA TO THE POTENTIAL CASH TRANSACTION ENTRY BASED, AT LEAST IN PART, ON THE IDENTIFIED BUSINESS OPERATION 313, and provided to the user at PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315, is approved by the user, including approval of the automatically entered description and/or categorization data for the potential cash transaction entry, and/or input/edits to the potential cash transaction entry, are provided by the user.

In one embodiment, if the potential cash transaction entry is approved at OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317, the user is also asked to provide data indicating the amount of the cash transaction at OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317.

In various embodiments, the approval/edits of the potential cash transaction entry and the data indicating the amount of the cash transaction is obtained at OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317 through the user mobile computing system of PROVIDE A FINANCIAL MANAGEMENT SYSTEM AND A USER MOBILE COMPUTING SYSTEM OPERATION 303 and one or more user interfaces and/or interface devices, or mechanisms, as discussed herein, and/or as known/available in the art at the time of filing, and/or as developed/made available after the time of filing.

In one embodiment, once data representing the potential cash transaction entry is approved by the user, including approval of the automatically entered description and/or categorization data for the potential cash transaction entry, and/or input/edits to the potential cash transaction entry are provided by the user, and the user provides data indicating the amount of the cash transaction, at OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317, process flow proceeds to TRANSFORM THE DATA REPRESENTING THE POTENTIAL CASH TRANSACTION ENTRY AND AUTOMATICALLY ASSIGNED DESCRIPTION AND/OR CATEGORY DATA AND THE AMOUNT DATA INTO APPROVED CASH TRANSACTION DATA OPERATION 319.

In one embodiment, at TRANSFORM THE DATA REPRESENTING THE POTENTIAL CASH TRANSACTION ENTRY AND AUTOMATICALLY ASSIGNED DESCRIPTION AND/OR CATEGORY DATA AND THE AMOUNT DATA INTO APPROVED CASH TRANSACTION DATA OPERATION 319, upon user approval at OBTAIN APPROVAL OF THE DATA REPRESENTING THE POTENTIAL CASH TRANSACTION ENTRY AND AUTOMATICALLY ASSIGNED DESCRIPTION AND/OR CATEGORY DATA AND AMOUNT DATA INDICATING THE AMOUNT OF THE CASH TRANSACTION FROM THE USER OPERATION 317, the potential cash transaction entry data of PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315, including the automatically entered description and/or categorization data for the potential cash transaction entry, and the amount data, is transformed into validated cash transaction entry data.

In one embodiment, upon user approval, the potential cash transaction entry data, including the automatically entered description and/or categorization data for the potential cash transaction entry, and the amount data, is transformed into validated cash transaction entry data under the direction of one or more processors, such as CPU 101 and/or CPU 121 of FIG. 1, associated with one or more computing systems, such as user mobile computing system 100 and/or process computing system 120 of FIG. 1.

Returning to FIG. 3, in one embodiment, once the potential cash transaction entry data of PROVIDE THE USER DATA REPRESENTING THE POTENTIAL CASH TRANSACTION ENTRY AND AUTOMATICALLY ASSIGNED DESCRIPTION AND/OR CATEGORY DATA OPERATION 315, including the automatically entered description and/or categorization data for the potential cash transaction entry, and the amount data, is transformed into validated cash transaction entry data at TRANSFORM THE DATA REPRESENTING THE POTENTIAL CASH TRANSACTION ENTRY AND AUTOMATICALLY ASSIGNED DESCRIPTION AND/OR CATEGORY DATA AND THE AMOUNT DATA INTO APPROVED CASH TRANSACTION DATA OPERATION 319, process flow proceeds to PROVIDE THE VALIDATED CASH TRANSACTION DATA TO THE FINANCIAL MANAGEMENT SYSTEM FOR PROCESSING OPERATION 321.

In one embodiment, at PROVIDE THE VALIDATED CASH TRANSACTION DATA TO THE FINANCIAL MANAGEMENT SYSTEM FOR PROCESSING OPERATION 321 the validated cash transaction entry data of TRANSFORM THE DATA REPRESENTING THE POTENTIAL CASH TRANSACTION ENTRY AND AUTOMATICALLY ASSIGNED DESCRIPTION AND/OR CATEGORY DATA AND THE AMOUNT DATA INTO APPROVED CASH TRANSACTION DATA OPERATION 319 is provided to one or more of the one or more financial management systems of PROVIDE A FINANCIAL MANAGEMENT SYSTEM AND A USER MOBILE COMPUTING SYSTEM OPERATION 303 for processing and/or incorporation into one or more of the one or more financial management systems.

In one embodiment, once the validated cash transaction entry data of TRANSFORM THE DATA REPRESENTING THE POTENTIAL CASH TRANSACTION ENTRY AND AUTOMATICALLY ASSIGNED DESCRIPTION AND/OR CATEGORY DATA AND THE AMOUNT DATA INTO APPROVED CASH TRANSACTION DATA OPERATION 319 is provided to one or more of the one or more financial management systems of PROVIDE A FINANCIAL MANAGEMENT SYSTEM AND A USER MOBILE COMPUTING SYSTEM OPERATION 303 for processing and/or incorporation into one or more of the one or more financial management systems at PROVIDE THE VALIDATED CASH TRANSACTION DATA TO THE FINANCIAL MANAGEMENT SYSTEM FOR PROCESSING OPERATION 321, process flow proceeds to EXIT OPERATION 330. In one embodiment, at EXIT OPERATION 330 process for automatically obtaining and categorizing cash transaction data using a mobile computing system 300 is exited to await new data.

In the discussion above, certain aspects of one embodiment include process steps or operations or instructions described herein for illustrative purposes in a particular order or grouping. However, the particular order or grouping shown and discussed herein are illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein do not limit the scope of the invention as claimed below.

Using process for automatically obtaining and categorizing cash transaction data using a mobile computing system 300, potential cash transaction entry data, including description and/or categorization data, is generated automatically based on geo-location data associated with the user. Therefore, all a user needs to do is review the potential cash transaction entry, provide the transaction amount, and indicate approval of the cash transaction entry. The approved/validated cash transaction entry is then automatically provided to, and used by, the user's financial management system. Consequently, process for automatically obtaining and categorizing cash transaction data using a mobile computing system 300 provides the user a simple and efficient way to capture cash transaction data and integrate the cash transaction data into one or more financial management systems. Consequently, using process for automatically obtaining and categorizing cash transaction data using a mobile computing system 300 financial management systems are easier to use and incorporate in a largely mobile computing system centric world.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s and discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for automatically obtaining and categorizing cash transaction data using a mobile computing system comprising:

providing a consumer financial management system under the control of a consumer;

defining one or more cash transaction triggers for determining that a consumer cash transaction has potentially taken place, the one or more defined cash transaction triggers at least including user being at a cash transaction business location for at least a predefined threshold amount of time;

monitoring geo-location data of a consumer mobile computing system of the consumer, the geo-location data representing a location of the consumer mobile computing system;

determining from the geo-location data that the consumer has been at a cash transaction business location for more than the predefined threshold amount of time;

recording the location of the consumer mobile computing system at the time the determination is made that the consumer has been at a cash transaction business location for more than the predefined threshold amount of time;

identifying the cash transaction business at the location when the determination was made that the consumer has been at a cash transaction business location for more than the predefined threshold amount of time, wherein the identifying the cash transaction business comprises comparing the location of the consumer mobile computing system at the time when the determination was made that the consumer has been at a cash transaction business location for more than the predefined threshold amount of time with data in a database mapping geo-location data to businesses associated with geo-locations;

generating potential cash transaction entry data for the consumer financial management system and automatically providing data indicating the description and/or category of the potential cash transaction entry based, at least in part, on the identified business;

presenting the potential cash transaction entry data to the consumer mobile computing system for consumer approval and entry of amount data associated with the potential cash transaction entry;

receiving, through the consumer mobile computing system, consumer approval and the amount data associated with the potential cash transaction entry from the consumer;

transforming the potential cash transaction entry data into validated cash transaction entry data; and providing the validated cash transaction entry data to the consumer financial management system for processing.

2. The method for automatically obtaining and categorizing cash transaction data using a mobile computing system of claim 1, wherein;
the consumer mobile computing system is a mobile phone.

3. The method for automatically obtaining and categorizing cash transaction data using a mobile computing system of claim 1, wherein;
the geo-location data of the consumer mobile computing system is obtained from a GPS capability of the consumer mobile computing system.

4. The method for automatically obtaining and categorizing cash transaction data using a mobile computing system of claim 1, wherein;
at least one of the one or more cash transaction triggers includes the consumer taking one or more deliberate actions to indicate that a cash transaction is taking place.

5. The method for automatically obtaining and categorizing cash transaction data using a mobile computing system of claim 1, wherein;
at least one of the one or more cash transaction triggers includes geo-location data and consumer financial transaction data indicating the consumer is at a business location historically frequented by the consumer and where cash transactions historically take place.

6. The method for automatically obtaining and categorizing cash transaction data using a mobile computing system of claim 1, wherein;
at least one of the one or more cash transaction triggers includes geo-location data and date or time data indicating the consumer is at a business location at a time or date historically associated with cash transactions conducted by the consumer.

7. A computing system implemented process for automatically obtaining and categorizing cash transaction data using a mobile computing system comprising:

using one or more processors to implement a consumer financial management system under the control of a consumer;

defining one or more cash transaction triggers for determining that a consumer cash transaction has potentially taken place, the one or more defined cash transaction triggers at least including user being at a cash transaction business location for at least a predefined threshold amount of time;

using one or more processors to monitor geo-location data of a consumer mobile computing system, the geo-location data representing a location of the consumer mobile computing system;

using one or more processors to determine from the geo-location data that the consumer has been at a cash transaction business location for more than the predefined threshold amount of time;

using one or more processors to record the location of the consumer mobile computing system at the time the determination is made that the consumer has been at a cash transaction business location for more than the predefined threshold amount of time;

using one or more processors to identify the cash transaction business at the location of the consumer mobile computing system when the determination was made that the consumer has been at a cash transaction business location for more than the predefined threshold amount of time, wherein the identifying the cash transaction business comprises comparing the location of the consumer mobile computing system at the time when the determination was made that the consumer has been at a cash transaction business location for more than the predefined threshold amount of time with data in a database mapping geo-location data to businesses associated with geo-locations;

using one or more processors to generate potential cash transaction entry data for the consumer financial management system and automatically providing data indicating the description and/or category of the potential cash transaction entry based, at least in part, on the identified business;

using one or more processors to present the potential cash transaction entry data to the consumer mobile computing system for approval and entry of amount data associated with the potential cash transaction entry;

using one or more processors to receive, through the consumer mobile computing system, consumer approval and the amount data associated with the potential cash transaction entry from the consumer;

using one or more processors to transform the potential cash transaction entry data into validated cash transaction entry data; and using one or more processors to provide the validated cash transaction entry data to the consumer financial management system for processing.

8. The computing system implemented process for automatically obtaining and categorizing cash transaction data using a mobile computing system of claim 7, wherein;
the consumer mobile computing system is a mobile phone.

9. The computing system implemented process for automatically obtaining and categorizing cash transaction data using a mobile computing system of claim 7, wherein;
the geo-location data of the consumer mobile computing system is obtained from a GPS capability of the consumer mobile computing system.

10. The computing system implemented process for automatically obtaining and categorizing cash transaction data using a mobile computing system of claim 7, wherein;
at least one of the one or more cash transaction triggers includes the consumer taking one or more deliberate actions to indicate that a cash transaction is taking place.

11. The computing system implemented process for automatically obtaining and categorizing cash transaction data using a mobile computing system of claim 7, wherein;
at least one of the one or more cash transaction triggers includes geo-location data and consumer financial transaction data indicating the consumer is at a business location historically frequented by the consumer and where cash transactions historically take place.

12. The computing system implemented process for automatically obtaining and categorizing cash transaction data using a mobile computing system of claim 7, wherein;
at least one of the one or more cash transaction triggers includes geo-location data and date or time data indicating the consumer is at a business location at a time or date historically associated with cash transactions conducted by the consumer.

13. A system for automatically obtaining and categorizing cash transaction data using a mobile computing system comprising:
a consumer mobile computing system;
a consumer financial management system under the control of a consumer, the consumer financial management system being implemented by one or more processors of one or more computing systems; and
one or more processors of one or more computing systems, the one or more computing systems implementing a process for automatically obtaining and categorizing cash transaction data using a mobile computing system, the process for automatically obtaining and categorizing cash transaction data using a mobile computing system including:
using the one or more processors of one or more computing systems to obtain data defining one or more cash transaction triggers for determining that a consumer cash transaction has potentially taken place, the one or more defined cash transaction triggers at least including user being at a cash transaction business location for at least a predefined threshold amount of time;
using the one or more processors of one or more computing systems to monitor geo-location data of the consumer mobile computing system, the geo-location data representing a location of the consumer mobile computing system;
using the one or more processors of one or more computing systems to determining from the geo-location data that the consumer has been at a cash transaction business location for more than the predefined threshold amount of time;
using the one or more processors of one or more computing systems to record the location of the consumer mobile computing system at the time the determination is made that the consumer has been at a cash transaction business location for more than the predefined threshold amount of time;
using the one or more processors of one or more computing systems to identify the cash transaction business at the location when the determination was made that the consumer has been at a cash transaction business location for more than the predefined threshold amount of time, wherein the identifying the cash transaction business comprises comparing the location of the mobile computing system at the time when the determination was made that the consumer has been at a cash transaction business location for more than the predefined threshold amount of time with data in a database mapping geo-location data to businesses associated with geo-locations;
using the one or more processors of one or more computing systems to generate potential cash transaction entry data for the consumer financial management system and automatically providing data indicating the description and/or category of the potential cash transaction entry based, at least in part, on the identified business;
using the one or more processors of one or more computing systems to present the potential cash transaction entry data to the consumer mobile computing system for approval and entry of amount data associated with the potential cash transaction entry;
using the one or more processors of one or more computing systems to receive, through the consumer mobile computing system, consumer approval and the amount data associated with the potential cash transaction entry from the consumer;
using the one or more processors of one or more computing systems to transform the potential cash transaction entry data into validated cash transaction entry data; and
using the one or more processors of one or more computing systems to provide the validated cash transaction entry data to the consumer financial management system for processing.

14. The system for automatically obtaining and categorizing cash transaction data using a mobile computing system of claim 13, wherein;
the consumer mobile computing system is a mobile phone.

15. The system for automatically obtaining and categorizing cash transaction data using a mobile computing system of claim 13, wherein;
the geo-location data of the consumer mobile computing system is obtained from a GPS capability of the consumer mobile computing system.

16. The system for automatically obtaining and categorizing cash transaction data using a mobile computing system of claim 13, wherein;
at least one of the one or more cash transaction triggers includes the consumer taking one or more deliberate actions to indicate that a cash transaction is taking place.

17. The system for automatically obtaining and categorizing cash transaction data using a mobile computing system of claim 13, wherein;
at least one of the one or more cash transaction triggers includes geo-location data and consumer financial transaction data indicating the consumer is at a business location historically frequented by the consumer and where cash transactions historically take place.

18. The system for automatically obtaining and categorizing cash transaction data using a mobile computing system of claim 13, wherein;
at least one of the one or more cash transaction triggers includes geo-location data and date or time data indicating the consumer is at a business location at a time or date historically associated with cash transactions conducted by the consumer.

\* \* \* \* \*